United States Patent
Zoratti et al.

(10) Patent No.: US 12,380,457 B2
(45) Date of Patent: Aug. 5, 2025

(54) OPTIMAL ROUTING OF PAYMENTS

(71) Applicant: American Express Travel Related Services Company, Inc., New York, NY (US)

(72) Inventors: Michael S. Zoratti, Markman (CA); Tristan M. Fuentes, Mesa, AZ (US); Nicolas R. J. Blackwell, Worthing (GB)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 82 days.

(21) Appl. No.: 18/101,708

(22) Filed: Jan. 26, 2023

(65) Prior Publication Data

US 2024/0257138 A1    Aug. 1, 2024

(51) Int. Cl.
*G06Q 20/40* (2012.01)
*G06Q 20/08* (2012.01)

(52) U.S. Cl.
CPC ....... *G06Q 20/405* (2013.01); *G06Q 20/0855* (2013.01)

(58) Field of Classification Search
USPC .......................................................... 705/39
See application file for complete search history.

(56) References Cited

U.S. PATENT DOCUMENTS

| | | |
|---|---|---|
| 4,630,201 A | 12/1986 | White |
| 6,260,027 B1 | 7/2001 | Takahashi et al. |
| 7,099,850 B1 | 8/2006 | Mann, II et al. |
| 7,487,126 B2 | 2/2009 | Kwan |

(Continued)

FOREIGN PATENT DOCUMENTS

| | | |
|---|---|---|
| CN | 112769952 A | 5/2021 |
| CN | 115271718 | 11/2022 |
| WO | 2022125195 | 6/2022 |

OTHER PUBLICATIONS

Title: Privacy-Preserving Route Discovery for Payment Channel Networks Authors: Krzysztof Pietrzak et al. Date: Jul. 2021 (Year: 2021).*

(Continued)

*Primary Examiner* — Bennett M Sigmond
*Assistant Examiner* — Yongsik Park
(74) *Attorney, Agent, or Firm* — Thomas Horstemeyer, LLP (57) ABSTRACT

Disclosed are various embodiments for optimal routing of payments. A global transaction router hosted by a supernetwork instance can receive a payment request, where the payment request specifies an identifier for a recipient institution. The global transaction router can identify a plurality of routes from the global transaction router to a plurality of respective destination network hubs associated with the recipient institution. The global transaction router can calculate a score for individual routes of the plurality of routes, where the score is based on a plurality of routing factors. The routing factors can be weighted based at least in part on routing preferences included with the payment request. The global transaction router can select one of the plurality of routes based on the score and cause the payment request to be provided to a destination network hub on the one of the plurality of routes.

20 Claims, 7 Drawing Sheets

(56) References Cited

U.S. PATENT DOCUMENTS

| | | |
|---|---|---|
| 7,689,508 B2 | 3/2010 | Davis et al. |
| 8,452,654 B1 | 5/2013 | Wooters et al. |
| 8,583,549 B1 | 11/2013 | Mohsenzadeh |
| 8,606,640 B2 | 12/2013 | Brody et al. |
| 8,781,965 B2 | 7/2014 | Huster |
| 9,324,002 B2 | 4/2016 | Ryan et al. |
| 10,382,882 B2 | 8/2019 | Mac Nair et al. |
| 11,410,164 B1* | 8/2022 | Chheda ................. G06Q 20/10 |
| 11,687,903 B2 | 6/2023 | Pinto et al. |
| 11,775,977 B1 | 10/2023 | Kruse et al. |
| 11,790,373 B2 | 10/2023 | Piparsaniya et al. |
| 2001/0051915 A1 | 12/2001 | Ueno et al. |
| 2004/0122685 A1 | 6/2004 | Bunce |
| 2005/0250538 A1 | 11/2005 | Narasimhan et al. |
| 2006/0208065 A1 | 9/2006 | Mendelovich et al. |
| 2007/0255564 A1 | 11/2007 | Yee et al. |
| 2008/0010190 A1 | 1/2008 | Rackley, III et al. |
| 2008/0116264 A1 | 5/2008 | Hammad et al. |
| 2008/0215472 A1 | 9/2008 | Brown |
| 2008/0288376 A1* | 11/2008 | Panthaki ................ G06Q 40/02 705/40 |
| 2009/0119183 A1 | 5/2009 | Azimi et al. |
| 2009/0240626 A1 | 9/2009 | Hasson et al. |
| 2010/0191570 A1 | 7/2010 | Michaud et al. |
| 2010/0205091 A1 | 8/2010 | Graziano et al. |
| 2010/0299230 A1 | 11/2010 | Patterson et al. |
| 2011/0191161 A1 | 8/2011 | Dai |
| 2011/0201306 A1 | 8/2011 | Ali Al-Harbi |
| 2011/0276418 A1 | 11/2011 | Velani |
| 2011/0288922 A1 | 11/2011 | Thomas et al. |
| 2012/0066062 A1 | 3/2012 | Yoder et al. |
| 2012/0271712 A1 | 10/2012 | Katzin et al. |
| 2013/0030934 A1 | 1/2013 | Bakshi et al. |
| 2013/0048714 A1 | 2/2013 | Sharma et al. |
| 2013/0103584 A1 | 4/2013 | Eichner et al. |
| 2013/0126607 A1 | 5/2013 | Behjat |
| 2013/0198061 A1* | 8/2013 | Dheer ................. G06Q 20/425 705/39 |
| 2014/0012701 A1 | 1/2014 | Wall et al. |
| 2014/0025576 A1 | 1/2014 | Esch |
| 2014/0149285 A1 | 5/2014 | De Pradipta et al. |
| 2014/0164082 A1 | 6/2014 | Sun et al. |
| 2014/0236767 A1 | 8/2014 | Duggal et al. |
| 2014/0244365 A1 | 8/2014 | Price et al. |
| 2015/0006271 A1 | 1/2015 | Oppenheim et al. |
| 2015/0088674 A1 | 3/2015 | Flurscheim et al. |
| 2015/0186871 A1 | 7/2015 | Laracey |
| 2015/0220924 A1 | 8/2015 | Bakker |
| 2015/0235196 A1 | 8/2015 | Zhu et al. |
| 2015/0356565 A1 | 12/2015 | Chang et al. |
| 2016/0012430 A1 | 1/2016 | Chandrasekaran et al. |
| 2016/0071083 A1* | 3/2016 | Apps ................. G06Q 20/027 705/44 |
| 2017/0331724 A1* | 11/2017 | Carney ................. H04L 47/825 |
| 2019/0034922 A1* | 1/2019 | Castinado ............. G06Q 40/02 |
| 2019/0197512 A1 | 6/2019 | Nuzzi |
| 2019/0378098 A1* | 12/2019 | Lam ................. G06Q 20/027 |
| 2020/0005295 A1 | 1/2020 | Murphy |
| 2020/0151686 A1 | 5/2020 | Komandur et al. |
| 2020/0167773 A1 | 5/2020 | Cervenka et al. |
| 2021/0142317 A1 | 5/2021 | Kolls et al. |
| 2021/0182810 A1* | 6/2021 | Johnston ............. G06Q 20/085 |
| 2021/0216976 A1 | 7/2021 | Kaufman et al. |
| 2022/0044212 A1 | 2/2022 | Kaitha et al. |
| 2022/0058726 A1* | 2/2022 | Miller ................. G06Q 20/10 |
| 2022/0084020 A1 | 3/2022 | Gervais et al. |
| 2022/0215384 A1 | 7/2022 | Livingston et al. |
| 2023/0107552 A1* | 4/2023 | Wied ................. H04L 45/42 705/79 |

OTHER PUBLICATIONS

Wilcox, "It's time for your card portfolio check-up", Credit Union Times AL< Media Properties, LLC., Proquest Document Id: 2312953351, Nov. 8, 2019.

"Charge Anywhere provides notice of payment card incident", US Newswire, Washington, ProQuest Document Id: 1634487006, Dec. 9, 2014.

Connecting to Real-Time Networks—Fiserv Offers Multiple Options for Connectivity to Real-Time Networks, Including the FedNow Service and RTP Network published Aug. 23, 2023.

Now Gateway: RTP Network—Your Connection to Real-Time Payments published Aug. 22, 2022.

SWIFT gpi Brochure Sep. 2019.

SWIFT gpi Driving a Payments Revolution published Oct. 2020.

* cited by examiner

OPTIMAL ROUTING OF PAYMENTS

BACKGROUND

Financial institutions use real-time payment networks to send funds to other participating financial institutions in real-time or near real-time. Financial institutions may also be members of other types of payment networks. Moreover, financial institutions may be members of multiple payment networks to offer multiple payment options to customers and to increase the ability of the financial institution to make electronic payments to other financial institutions.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for optimally routing payments between different real-time payment networks. Financial institutions are often members of real-time payment (RTP) networks to allow real-time payments between the financial institutions. Generally, as long as two financial institutions are members of the same RTP network, they can make real-time payments with each other.

However, there are multiple RTP networks currently available. If two financial institutions are not members or the same RTP network, then they cannot make a real-time payment with each other. This can happen when multiple RTP networks are available within the same jurisdiction (e.g., FedNow and THE CLEARING HOUSE in the United States) or when financial institutions are located in different jurisdictions that provide different RTP networks due to regulatory differences and oversight. Accordingly, the various embodiments of the present disclosure solve the problem that occurs when a first financial institution that is a member of a real-time payment network wants to make a real-time payment to a second financial institution that is not a member of the real-time payment network.

Further, when a financial institution is a member of multiple real-time payment networks, there may exist multiples routes by which a payment may reach that financial institution. However, this may introduce many options for real-time payment networks through which a payment may be routed. Likewise, each of these real-time payment networks may have a different speed, cost, or reliability associated with routing payments through that real-time payment network. In many cases, it may be unclear which options and which real-time payment network an account holder initiating a payment prefers. To that end, the various embodiments of the present disclosure solve this problem by choosing optimal an optimal route for a payment based on an account holder's preferences.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
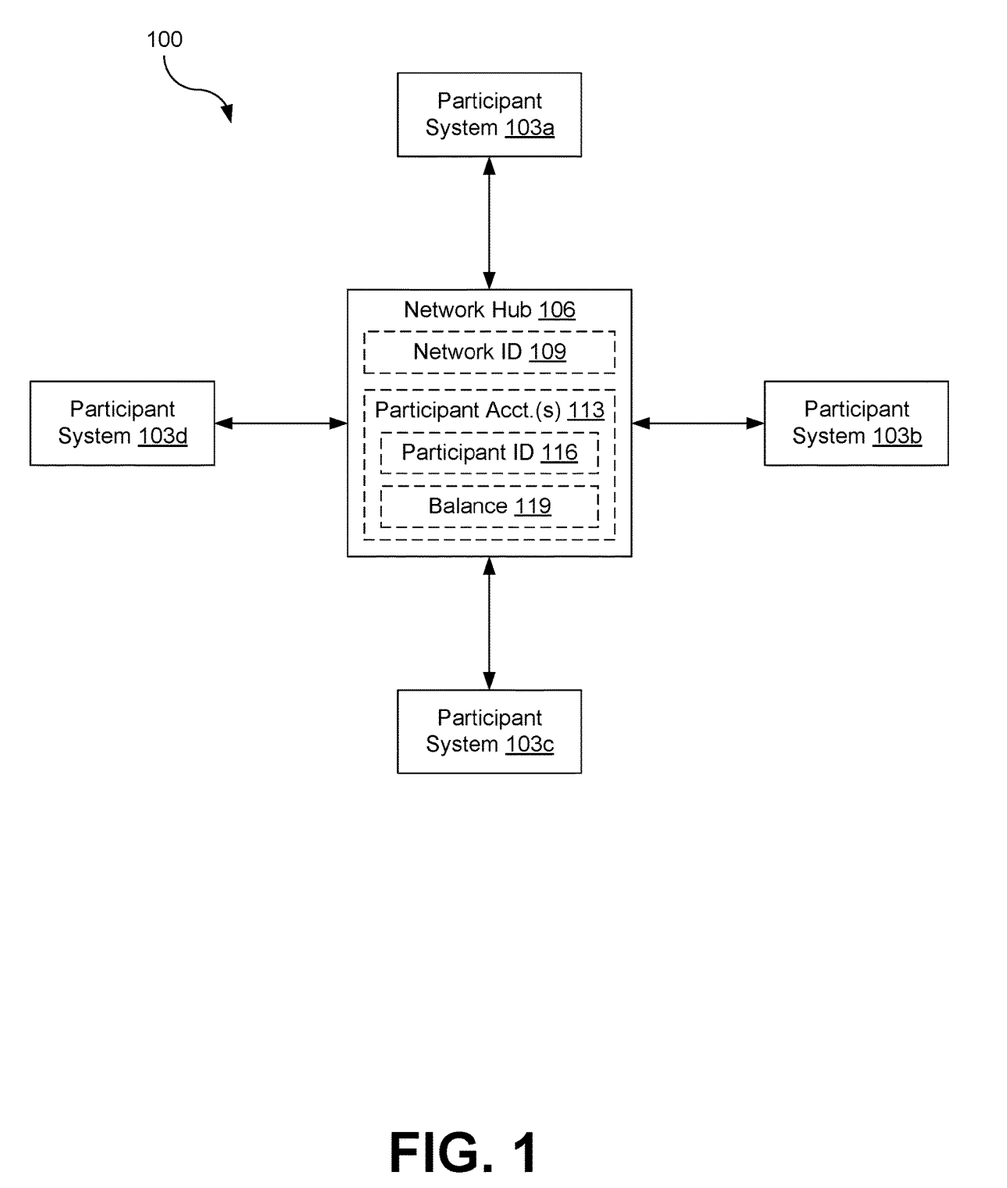
FIG. 1 is a drawing depicting a real time payment network according to various embodiments of the present disclosure.

FIG. 1 is a schematic block diagram depicting an example of a real-time payment (RTP) network 100. An RTP network 100 is payment rail or payment network that allows member institutions to make payments to each other with immediate availability at any time, in contrast to other payment rails or networks where payments may be take several days to process and/or may only be made or processed on specific days or hours (e.g., only on business days and/or only during business hours). Examples of RTP networks 100 in the United States are THE CLEARING HOUSE RTP network offered by The Clearing House and the FEDNOW RTP network offered by the Federal Reserve. Other RTP networks 100 may be available in other jurisdictions.

The RTP 100 can have a number of components, such as one or more participant systems 103 (e.g., participant system 103a, participant system 103b, participant system 103c, participant system 103d, etc.) and a network hub 106. Participant systems 103 represent systems owned or operated by members of the RTP network 100, such as banks or other financial institutions that use the RTP network 100 to send and receive payments in real time. The network hub 106 can represent one or more computing systems and software services that receive and reconcile payment requests from participant systems 103.

Figure 2:
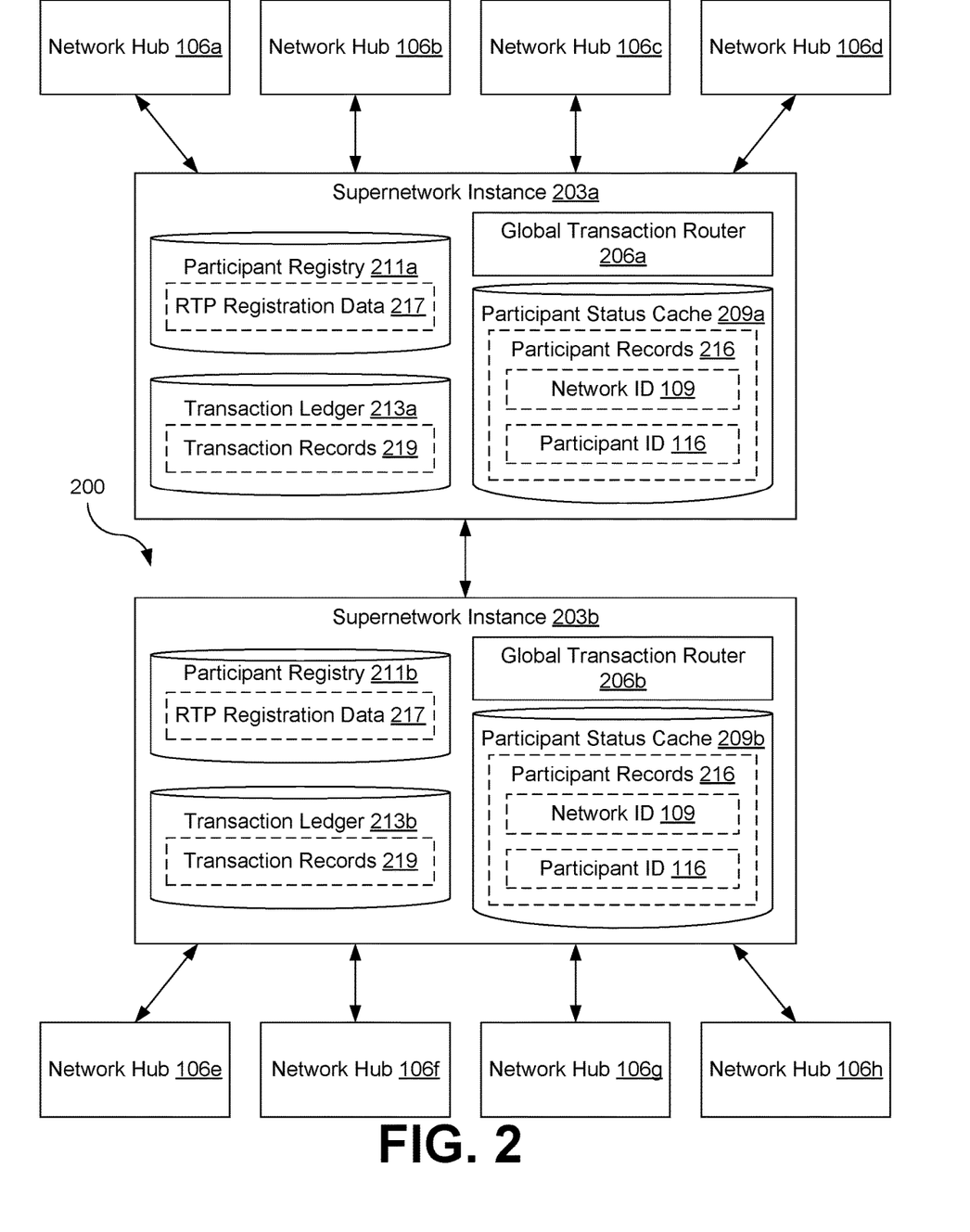
FIG. 2 is a drawing of a supernetwork according to various embodiments of the present disclosure.

Accordingly, the network hub 106 can store various data to allow it to facilitate payments from one network participant 103 to another network participant 103, as well as route payments from a network participant 103 of the RTP network 100 to another network participant 103 of another RTP network 100 using a supernetwork 200 (FIG. 2). This data could include a network identifier 109 and one or more participant accounts 113.

The network identifier 109 can represent any identifier that uniquely identifies an RTP network 100 with respect to another RTP network 100. The network identifier 109 can be used by the supernetwork 200 to identify or distinguish between individual RTP networks 100 when routing payments between RTP networks 100.

Participant accounts 113 can be used by the network hub 106 to track the amount of funds each participant system 103 has on deposit with the RTP network 100. Accordingly, each participant system 103 of a participant can be associated with a participant account 113. A participant account 113 can include information such as a participant identifier 116 and a balance 119. The participant identifier 116 can be any identifier that uniquely identifies a participant system 103, and therefore a participant, with respect to another participant system 103, and therefore another participant. The balance 119 can represent the amount of funds available in the participant account 113 to a respective participant. When a payment request is sent by a first participant system 103, the amount of the balance 119 in the participant account 113 associated with the first participant system 103 is reduced by the amount specified in the payment request. Meanwhile, the amount of the balance 119 in the participant account 113 of the second, recipient participant system 103 is increased by the amount specified in the payment request.

Moreover, an operator of the supernetwork 200 can also maintain a participant account 113 with the RTP network 100. The participant account 113 of the supernetwork 200 can be used by the supernetwork 200 to facilitate payments between members of the RTP network 100 and members of other RTP networks 100, as described in further detail later.

In addition, when a payment request is sent by a participant system 103, that payment request can include one or more routing preferences. The one or more routing preferences can enable the supernetwork 200 to route the payment request in accordance with the preferences of an account holder or other entity that initiated the payment request. The one or more routing preferences can include, for example, preferences on payment speed, payment cost, payment network reliability, payment timing, the existence of bank cutoff times or holidays that could interfere with a payment, the existence of offers or other incentives, and potentially other factors.

The one or more routing preferences can be provided by the account holder, for example, when the account holder creates an account or enrolls with the participant system 103. As another example, the one or more routing preferences can be provided by the account holder when initiating a payment request. In such an example, the provided routing preferences can override previously provided routing preferences, if any.

In some implementations, however, the one or more routing preferences can be generated and provided by the participant system 103. For example, the one or more routing preferences can take the place of routing preferences provided by the account holder. As another example, the one or more routing preferences can serve as preferences for the participant system itself 103 rather than those of a particular account holder.

FIG. 2 is a schematic block diagram depicting an example of a supernetwork 200 according to various embodiments of the present disclosure. The supernetwork 200 can be implemented to route payments between different RTP networks 100 (FIG. 2), thereby allowing a participant of a first RTP network 100 to make a real time payment to a participant of a separate, second RTP network 100. Accordingly, the supernetwork 200 can include one or more supernetwork instances 203, such as supernetwork instance 203a and supernetwork instance 203b, that form a peer-to-peer network with each other. Each supernetwork instance 203 can be in data communication with one or more network hubs 106, such as network hubs 106a, 106b, 106c, 106, 106e, 106f, 106g, and 106h.

Each supernetwork instance 203 can include a number of components. For example, a super network instance 203 can include a global transaction router 206, a participant status cache 209, a participant registry 211, and a transaction ledger 213. The global transaction router 206 can be executed to route payment requests between network hubs 106 of different RTP networks 100 connected to a supernetwork instance 203

The participant status cache 209, participant registry 211, and the transaction ledger 213 are all representative of data stores and associated with the operation of the various applications or functional entities of the various embodiments of the present disclosure. The participant status cache 209, participant registry 211, and the transaction ledger 213 can be implemented as relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. In many instances of the present disclosure, participant status cache 209, participant registry 211, and the transaction ledger 213 can be implemented as distributed, eventually consistent data stores in order to synchronize the data across multiple supernetwork instances 203. The participant status cache 209 can include one or more participant records 216. The participant registry 211 can store RTP registration data 217. Meanwhile the transaction ledger 213 can include one or more transaction records 219. Other data can also be stored in the participant status cache 209, participant registry 211, or the transaction ledger 213 as desired by various embodiments of the present disclosure. Moreover, while depicted separately, the data stored in the participant status cache 209, participant registry 211, and the transaction ledger 213 can be combined into one or more data stores in some implementations.

A participant record 216 represents a record of a participant system 103 that is a member of an RTP network 100. Each participant record 216 can include the network identifier 109 of the RTP network 100 that the participant system 103 is a member of, as well as the participant identifier 116 of the participant system 103 in the RTP network 100. If a participant or participant system 103 is a member of or participant in multiple RTP networks 100, then the participant or participant system 103 could be associated with multiple participant records 216. Other information can also be included in a participant record 216 as desired for particular implementations of the present disclosure.

RTP registration data 217 includes information about individual RTP networks 100 with a network hub 106 connected to a supernetwork instance 203 of the supernetwork. RTP registration data 217 can include a list of network hubs 106 or RTP networks 100 and the individual supernetwork instances 203 that the network hubs 106 are connect to or in data communication with. For example, RTP registration data 217 could map a network identifier 109 for an RTP network 100 to a particular supernetwork instance 203 (e.g., by using an instance identifier of the supernetwork instance 203). Other information regarding individual RTP networks 100 could also be stored in the RTP registration data 217 as desired for individual implementations of the present disclosure.

A transaction record 219 can represent a record of a transaction made between participants of two different RTP networks 100 within the supernetwork 200. Information stored in the transaction record 219 can include the participant identifier 116 and network identifier 109 of the payer, the participant identifier 116 and network identifier 109 of the payee, the amount of the transaction, as well as any other information that may be relevant to a particular embodiment of the present disclosure.

Next, a general description of the operation of the various components of the supernetwork 200 is provided. Although the following description provides merely an example of the operation of the supernetwork 200, and the interactions between individual components, other interactions and operations can also be performed by the various embodiments of the present disclosure. More detailed description of the operation of individual components is illustrated in the flowcharts of FIGS. 3-8.

To begin, a network hub 106 of an RTP network 100 can be configured to connect to a supernetwork instance 203 of the supernetwork 200. As part of the connection process, the network hub 106 can be configured to send and receive message to the supernetwork instance 203 using a supernetwork compliant message protocol. The network hub 106 could also be configured to translate payment messages from the format of the RTP network 100 serviced by the network hub 106 to the supernetwork compliant message protocol, and vice versa. Moreover, during the registration or first connection of the network hub 106 of the RTP network 100 with the supernetwork instance 203, the RTP registration data 217 for the RTP network 100 could be saved to the participant registry 211. For example, the network identifier 109 for the RTP network 100 could be saved in association with an instance identifier of the supernetwork instance 203 that the network hub 106 is connected to. The participant registry 211 could then replicate, distribute, or synchronize the RTP registration data with other participant registries 211 of other supernetwork instances 203.

Subsequently, the network hub 106 could provide a list of all participants in the RTP network 100 of the network hub 106 to the global transaction router 206 of the supernetwork instance 203. This could include the network identifier 109 of the RTP network 100 of the network hub 106, as well as the participant identifiers 116 of the participant systems 103 of the RTP network 100 of the network hub 106. In response, the global transaction router 206 could create and save a participant record 216 for each of the participants of the RTP network 100 of the network hub 106 to the participant status cache 209. The participant status cache 209 could then replicate, distribute, or synchronize the newly created participant records 216 to other participant status caches 209 of other supernetwork instances 203.

Later, a network hub 106 of a first RTP network 100 (e.g., network hub 106a) could receive a payment request from a participant system 103 to send a payment to a second participant system 103 that is part of a second RTP network 100 that uses a second network hub 106 (e.g., network hub 106h). The first network hub 106a could determine that the recipient of the transaction is not a member of the first RTP network 100. In response, the first network hub 106a could create and send a payment request to the global transaction router 206a executed by the supernetwork instance 203a that the network hub 106a is connected to.

The global transaction router 206a could evaluate the payment request to identify possible routes for the payment request. For example, the global transaction router 206a could query the participant status cache 209a to determine whether there is a participant record 216 matching a participant identifier 116 for the recipient. If a participant record 216 exists, the global transaction router 206a could retrieve one or more network identifiers 109 to determine which network hubs 106 the payment request can be routed to. In some cases, a recipient may be a member of more than one RTP network 100, in which case a payment request may be routed to one of multiple possible network hubs 106. Each network identifier 109 from the recipient's participant record 216 can therefore represent a possible route for the payment request. If any network identifier 109 fails to match a network identifier 109 of a network hub 106 connected to the supernetwork instance 203a, then the global transaction router 206a could query the RTP registration data 217 in the participant registry 211a to determine which supernetwork instance 203 (e.g., supernetwork instance 203b) the payment request would be routed to if the corresponding route were selected.

The global transaction router 206a can select a route for the payment request from the possible routes identified by the global transaction router 206a. The global transaction router 206a can make this determination based on a score calculated using a plurality of weighted routing factors. The routing factors can provide criteria for evaluating the desirability of using a particular route- and, by extension, of routing the payment request to an RTP network 100 associated with the route.

The routing factors corresponding to a particular RTP network 100 can be based on information stored in the RTP registration data 217 for the RTP network 100. Examples of routing factors can include a speed of payments made using an RTP network 100, cost of the payment if made using the RTP network 100, reliability of the RTP network 100, timing options for the payment, whether any cutoff time or holiday will interfere with completion of the payment, whether the payment can be batched, the availability of sponsored offers or other incentives for the payment, and potentially other routing factors.

A speed routing factor can represent how quickly an RTP network 100 can processes payments over the supernetwork 200. The global transaction router 206a can evaluate the speed factor of an RTP network 100 based on, for example, historical data indicating the speed of previous transactions involving that RTP network 100. As another example, the global transaction router 206a can evaluate the speed factor in real time by continually pinging the RTP network 100.

A cost factor can represent an amount of money that a payer pays to make a payment using an RTP network 100. The cost factor can in some cases depend on other options selected for a particular payment.

A reliability factor can represent how reliably an RTP network 100 processes payments. The reliability factor can be based on, for example, whether an RTP network 100 tends to successfully complete payments without issue.

A timing factor can represent whether an RTP network 100 can process and complete a payment by a particular time and/or within a particular time frame desired by a payer. For example, the timing factor can be based on whether an RTP network 100 can process a payment in real-time or at a scheduled time specified by a payer.

A cutoff factor can represent whether an RTP network 100 imposes any cutoffs that could interfere with completion of the payment. For example, the timing factor can be based on whether an RTP network 100 can complete a payment by a cutoff time imposed by a recipient or whether any holiday will delay or interfere with the completion of the payment.

A batching factor can represent whether an RTP network 100 can batch a particular payment together with one or more other payments to be processed as a single payment. For example, the batching factor can be based on whether an RTP network 100 allows a payee to elect to combine more than one payment. As another example, the batching factor can be based on whether an RTP network 100 supports combining multiple payments being processed within a particular time frame, which may lead to cost savings for a payer.

A sponsored offer factor can represent whether an RTP network 100 offers any incentives for using the RTP network 100 to make a payment. For example, an RTP network 100 can promote a sponsored offer that allows a payee to make a specified number of payments free of charge.

The global transaction router 206a can assign a weight to each of the routed factors based on one or more routing preferences included with the payment request. The one or more routing preferences can aid the global transaction router 206a to route the payment request in accordance with a participant system 103, payee, account holder, or other entity initiating the payment request. Each of the one or more routing preferences can indicate how important a corresponding routing factor should be when selecting a route for the payment request. For example, the one or more routing preferences can indicate that a preference for routes with high speed but also a higher cost compared to other possible routes. The global transaction router 206a can therefore give the speed factor a greater weight than the cost factor.

The global transaction router 206a can calculate a score for each possible route based on the weighted routing factors and select a route with a highest score. A route's score can be higher if the route better reflects a user's routing preferences. That is, a route can receive a higher score if the route is in accordance with routing factor(s) assigned greater weight. For example, if the speed factor is assigned a greater weight than the other routing factors, a route with a highest speed factor among the possible routes could receive a high score. The global transaction router 206a can select this route if it has a highest score among the possible routes.

The global transaction router 206a could then send the payment request to the appropriate global transaction router 206b for the selected routing path. The global transaction router 206b can receive the payment request and evaluate it to determine which network hub 106 to route the payment request to. For example, the global transaction router 206b could compare the network identifier 109 specified in the payment request to the network identifiers 109 of the network hubs 106 connected to the supernetwork instance 203b. If the network identifier 109 in the payment request matches the network identifier 106 of a connected network hub 106, such as network hub 106h, then the global transaction router 206b could forward the payment request to the recipient network hub 106h.

The recipient network hub 106h could return a response message, which either accepts or rejects the payment request, to the global transaction router 206b. The global transaction router 206b could then relay the response message to the global transaction router 206a, and the global transaction router 206a could relay the response message to the source network hub 106a.

Figure 3:
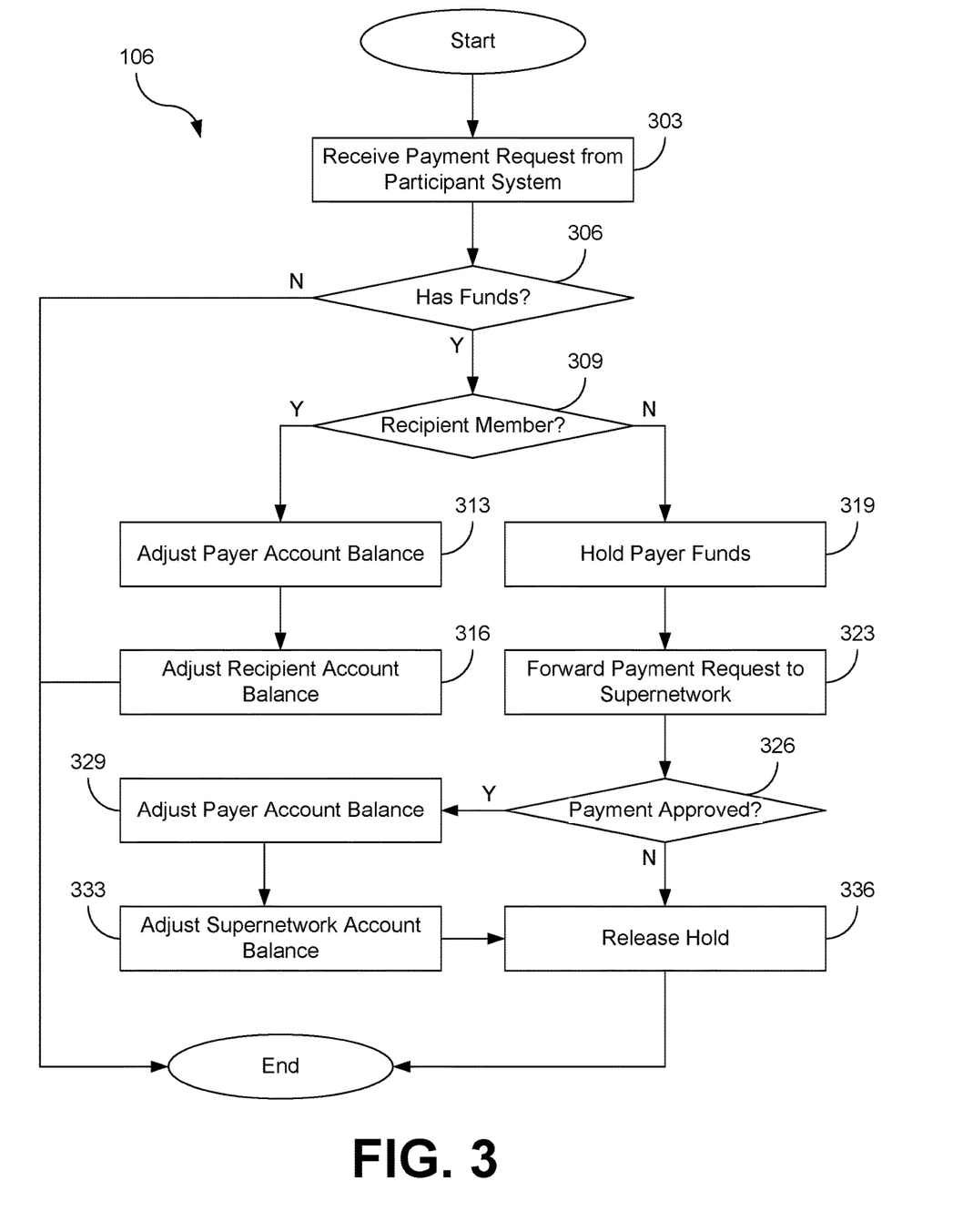
FIG. 3 is a flowchart illustrating one example of functionality implemented as portions of an application executed in a computing environment in the super network of FIG. 2 according to various embodiments of the present disclosure.

Referring next to FIG. 3, shown is a flowchart that provides one example of the operation of a portion of a network hub 106. The flowchart of FIG. 3 provides merely an example of the many different types of functional arrangements that can be employed to implement the operation of the depicted portion of the network hub 106. As an alternative, the flowchart of FIG. 3 can be viewed as depicting an example of elements of a method implemented within the RTP network 100 or the supernetwork 200.

Beginning with block 303, the network hub 106 can receive a payment request from a participant system 103. The payment request can include information such as the participant identifier 116 of the recipient, the participant identifier 116 of the payee, the amount of the payment, and potentially other information.

Then, at block 306, the network hub 106 can determine whether the balance 119 of the participant account 113 associated with the participant identifier 116 of the payee that submitted the payment request at block 303 has sufficient funds to settle the payment. If the balance 119 of the participant account 113 has insufficient funds to settle the payment, then the process can end. Optionally, the network hub 106 could send a rejection or error message to the participant system that submitted the payment request. However, if the balance 119 of the participant account 113 has sufficient funds, then the process can proceed to block 309.

Moving on to block 309, the network hub 106 can determine if the recipient identified in the payment request is a participant in the RTP network 100. For example, the network hub 106 could search for a participant account 113 with a participant identifier 116 matching the participant identifier 116 specified in the payment request. If matching participant account 113 is found, then the network hub 106 can determine that the recipient is member of the RTP network 100 and the process can proceed to block 313. However, if a matching participant account 113 is not found, then this would indicate that the recipient is not a member of the RTP network 100. In this situation, the process could proceed to block 319.

If the process proceeds to block 313, the network hub 106 can adjust the account balance 119 of the participant account 113 of the payer. For example, the network hub 106 could deduct an amount of funds from the account balance 119 equal to the amount of funds specified in the payment request.

Next, at block 316, the network hub 106, can similarly adjust the account balance 119 of the participant account 113 of the recipient. For example, the network hub 106 could add an amount of funds to the account balance 119 of the recipient equal to the amount of funds specified in the payment request.

However, if the process instead proceeds to block 319, the network hub 106 can place a hold on the account balance 119 of the participant account 113 of the payer that submitted the payment request at block 303. This hold can be done to prevent double-spending of funds held in the participant account 113 of the payer while the network hub 106 forwards the payment request to a global transaction router 206 of a supernetwork instance 203

Then, at block 323, the network hub 106 can forward the payment request to the global transaction router 206 of the supernetwork instance 203 that the network hub 106 is connect to. In some implementations, the network hub 106 could create a new payment message or payment request that satisfies any protocol requirements of the supernetwork 200. Generally, such a new payment message or payment request would include at least the same information that is included in the original payment, but be formatted in a standardized way that could be processed by the global transaction router 206.

Moving on to block 326, the network hub 106 can wait until it receives a payment response message from the global transaction router 206 of the supernetwork instance 203 that the network hub 106 is connected to. Once the payment response message is received, the network hub 106 can analyze the payment response message to determine if the payment request was accepted by the recipient network hub 106 or if the payment request was rejected. If the payment response message indicates that the payment request was accepted, then the process can proceed to block 329. However, if the payment response message indicates that the payment request was rejected, then the process can skip to block 336.

If the process proceeds to block 329, the network hub 106 can adjust the payer account balance 119. For example, the network hub 106 could deduct an amount of funds from the account balance 119 equal to the amount specified in the payment request. In some instances, the payment response message could include additional transaction fees (e.g., transaction fees required by the supernetwork 200 or the recipient network hub 106 to process the payment). In these instances, the additional transaction fees could also be deducted from the account balance 119 of the participant account 113 of the payer.

Next, at block 333, the network hub 106 can adjust the account balance 119 of a participant account 113 associated with the operator of the supernetwork 200. For example, the network hub 106 could add an amount of funds equal to the amount specified in the payment request and any additional transaction fees to the account balance 119 of the participant account 113 of the supernetwork 200.

Once the process proceeds to block 336, the network hub 106 can release the hold on the account balance 119 of the participant account 113 of the payer. Then, the process could end.

Figure 4:
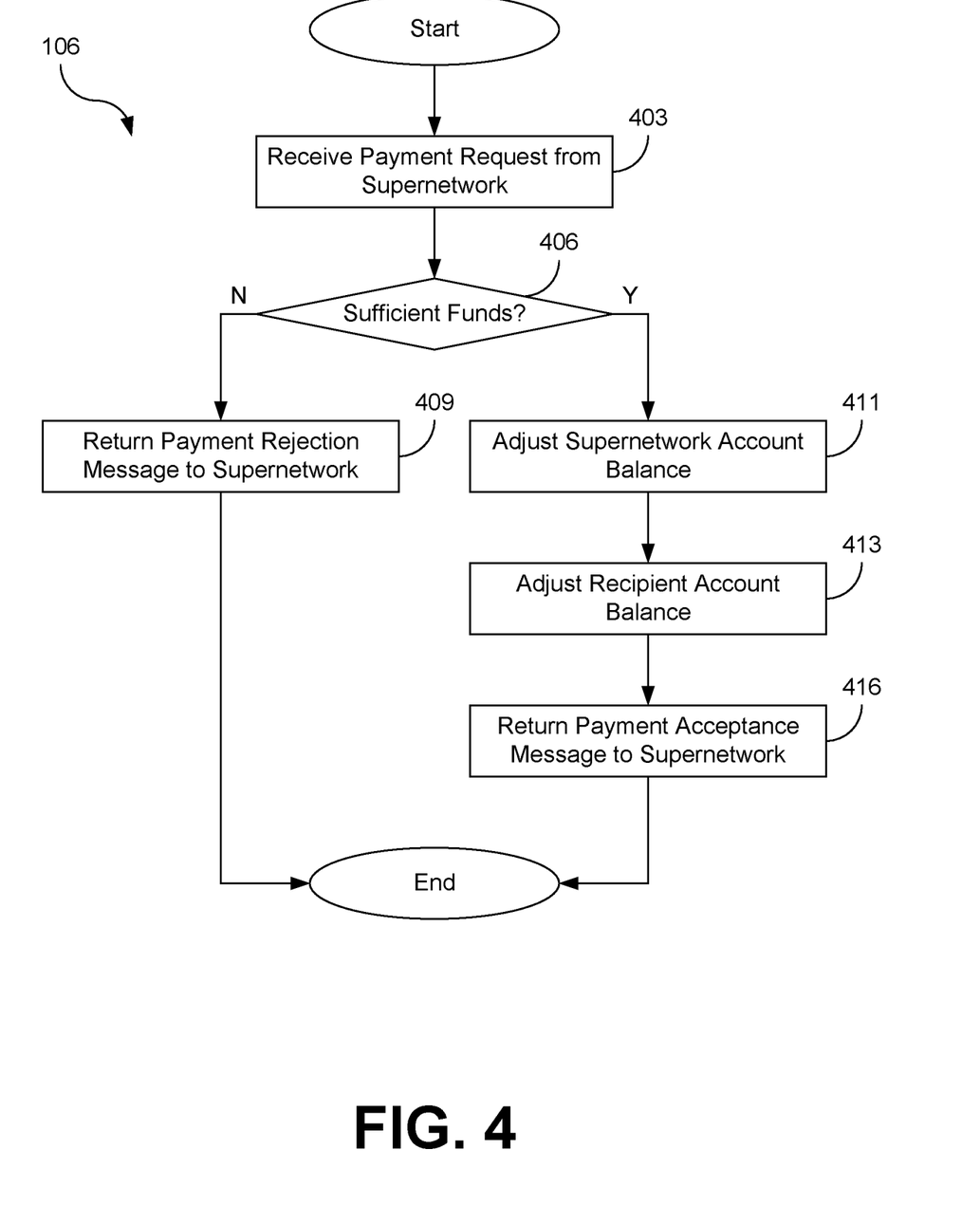
FIG. 4 is a flowchart illustrating one example of functionality implemented as portions of an application executed in a computing environment in the super network of FIG. 2 according to various embodiments of the present disclosure.

Referring next to FIG. 4, shown is a flowchart that provides one example of the operation of a portion of a network hub 106. The flowchart of FIG. 4 provides merely an example of the many different types of functional arrangements that can be employed to implement the operation of the depicted portion of the network hub 106. As an alternative, the flowchart of FIG. 4 can be viewed as depicting an example of elements of a method implemented within the RTP network 100 or the supernetwork 200.

Beginning with block 403, a network hub 106 can receive a payment request from a global transaction router 206 of a supernetwork instance 203 connected to the network hub 106. For example, if a first network hub 106a forwarded a payment request to the global transaction router 206a using the process described in FIG. 3, then a recipient network hub 106 (e.g., network hub 106h) could receive a corresponding payment request from the global transaction router 206b of the supernetwork instance 203b.

Then, at block 406, the network hub 106 can determine whether the account balance 119 of the participant account 113 associated with the operator of the supernetwork 200 has sufficient funds to complete the transaction. If there are insufficient funds (e.g., because the payment request is larger than the current account balance 119 of the supernetwork 200 within the RTP network 100), then the process can proceed to block 409. However, if there are sufficient funds to complete the payment request, then the process can proceed to block 411.

If the process proceeds to block 409, then the network hub 106 can generate a payment rejection message and return the payment rejection message to the global transaction router 206 of the supernetwork instance 203 that the network hub 106 is connected to. The payment rejection message can include the participant identifier 116 of the source of the payment and, potentially, the network identifier 109 of the source of the payment. In some instances, the payment rejection message could include a reason why the payment was rejected, while in other instances the reason for the rejection of the payment request could be omitted.

However, if the process proceeds to block 413, then the network hub 106 can adjust the account balance 119 of a participant account 113 associated with the operator of the supernetwork 200. For example, the network hub 106 could deduct an amount of funds equal to the amount specified in the payment request. The network hub 106 could also deduct any additional transaction fees from the account balance 119 of the participant account 113 of the operator of the supernetwork 200 to compensate the RTP network 100 operator for the costs of processing the transaction.

Next, at block 413, the network hub 106 can adjust the account balance 119 of the participant account 113 of the recipient. Accordingly, the network hub 106 could search for the participant account 113 matching the participant identifier 116 specified in the payment request. The network hub 106 could then add an amount of funds to the account balance 119 of the matching participant account 113 equal to the amount specified in the payment request.

Subsequently, at block 416, the network hub 106 could generate and return a payment acceptance message to the global transaction router 206 of the supernetwork instance 203 that the network hub 106 is connected to. The payment acceptance message could include information such as a confirmation code or number, a confirmation of the amount deposited to the account balance 119 of the recipient, a timestamp indicating the time at which the recipient received the funds, the participant identifier 116 of the source of the payment and, potentially, the network identifier 109 of the source of the payment, as well as other information. The process can then subsequently end.

Figure 5:
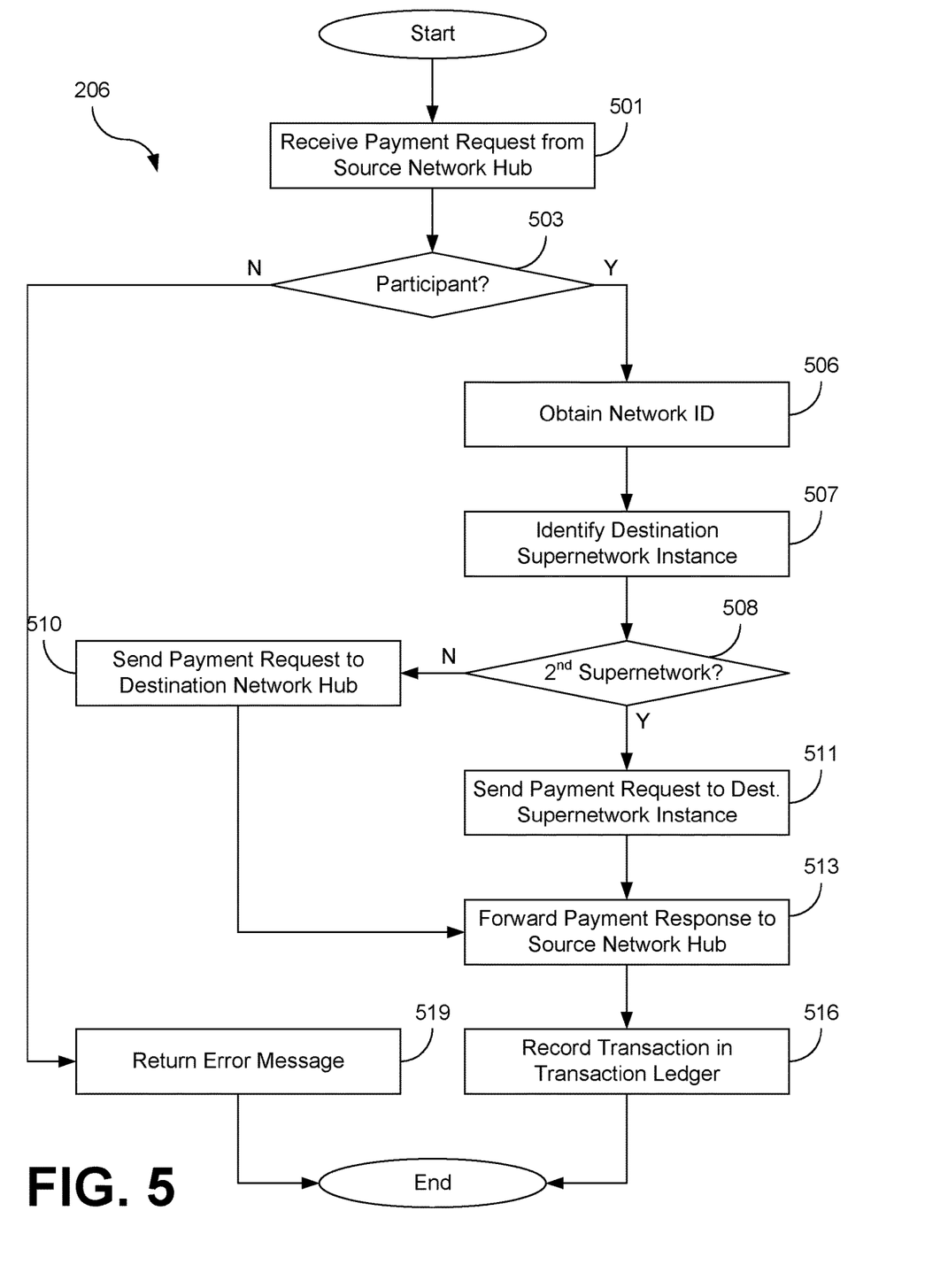
FIG. 5 is a flowchart illustrating one example of functionality implemented as portions of an application executed in a computing environment in the super network of FIG. 2 according to various embodiments of the present disclosure.

Referring next to FIG. 5, shown is a flowchart that provides one example of the operation of a portion of the global transaction router 206. The flowchart of FIG. 5 provides merely an example of the many different types of functional arrangements that can be employed to implement the operation of the depicted portion of the global transaction router 206. As an alternative, the flowchart of FIG. 5 can be viewed as depicting an example of elements of a method implemented within the supernetwork 200.

Beginning with block 501, the global transaction router 206 can receive a payment request from a source network hub 106. For example, the payment request could have been received as part of the process performed by the source network hub 106 at block 323. The payment request can include information such as the network identifier 109 and participant identifier 116 of the participant making the payment, the participant identifier 116 of the recipient, the network identifier 109 of the participant (if known), the amount of the payment, and potentially other information depending on the particular implementation of the present disclosure.

Moving on to block 503, the global transaction router 206 can determine whether the recipient of the payment request is a participant of an RTP network 100 with a network hub 106 connected to a supernetwork instance 203 of the supernetwork 200. This would network hub 106 would be the destination network hub 106 for the payment request. For example, the global transaction router 206 could search the participant status cache 209 to identify a participant record 216 with a matching participant identifier 116. If a participant record 216 exists, then the process can proceed to block 506. If no participant record 216 exists, then the process can instead skip to block 516.

Then, at block 506, the global transaction router 206 can obtain the network identifier 109 for the destination network hub 106 from the participant record 216 identified at block 503.

Next, at block 507, the global transaction router 206 can identify the supernetwork instance 203 which the destination network hub 106 associated with the destination network identifier 109 obtained at block 506 is connected to. For example, the global transaction router 206 could search the RTP registration data 217 in the participant registry 211 to identify the supernetwork instance 203 that is associated with the network identifier 109. However, in some implementations, the global transaction router 206 could cache a list of network hubs 106 that it is connected to, in which case the global transaction router 206 could query its cache instead of the participant cache registry 211.

Proceeding to block 508, the global transaction router 206 can determine whether the destination network hub 106 for the payment request is connected to the supernetwork instance 203 (e.g., supernetwork instance 203a) hosting the global transaction router 206, or is connected to a second supernetwork instance 203 (e.g., supernetwork instance 203b). This can be done by determining whether supernetwork instance 203 identified at block 507 is the same supernetwork instance 203 hosting the global transaction router 206. If the destination network hub 106 is connected to the same supernetwork instance 203 that is hosting the global transaction router 206, then the process can proceed to block 510. However, if the destination network hub 106 is connected to a second supernetwork instance 203, then the process can proceed to block 511.

If the process proceeds to block 510, the global transaction router 206 can send the payment request to the destination network hub 106 that is connected to the supernetwork instance 203 hosting the global transaction router 206. The global transaction router 206 can then wait to receive a response from the destination network hub 106 regarding the payment status.

However, if the process proceeds to block 511, the global transaction router 206 can send the payment request to the global transaction router 206 hosted by the supernetwork instance 203 identified at block 508. The global transaction router 206 can then wait to receive a response from the second global transaction router 206 regarding the payment status.

Later, at block 513, the global transaction router 206 can receive a payment response indicating the status of the payment request and return or forward it to the source network hub 106. For example, the global transaction router 206 could search the participant status cache 209 to identify a participant record 216 with a matching participant identifier 116. The global transaction router 206 could then determine the network identifier 109 for the destination of the message and determine that the network identifier 109 is for a network hub 106 (e.g., the source network hub 106) connected to the supernetwork instance 203 hosting the global transaction router 206. For example, the global transaction router 206 could query the RTP registration data in participant cache registry 211 to determine that the destination network hub 106 is connected to the global transaction router 206. However, in some implementations, the global transaction router 206 could cache a list of network hubs 106 that it is connected to, in which case the global transaction router 206 could query its cache instead of the participant cache registry 211.

The global transaction router 206 can also cache or temporarily store the payment response for use at block 516.

Then, at block 516, the global transaction router 206 store or record the transaction in the transaction ledger 213. For example, if the payment response received at block 513 were a payment acceptance message, then the global transaction router 206 could record a transaction record 219 in the transaction ledger 213 containing information such as a confirmation code or number, a confirmation of the amount deposited to the account balance 119 of the recipient, a timestamp indicating the time at which the recipient received the funds, the participant identifier 116 of the source of the payment and, potentially, the network identifier 109 of the source of the payment, as well as other information. Likewise, if the payment response were a payment rejection message, then the global transaction router 206 could record a transaction record 219 in the transaction ledger 213 containing the participant identifier 116 of the source of the payment and, potentially, the network identifier 109 of the source of the payment. In some instances, the payment rejection message could include a reason why the payment was rejected, in which case the reason for the rejection could also be included in the transaction record 219. The process could then end.

If the process proceeds to block 519, the global transaction router 206 can generate and return an error message to the source network hub 106 indicating that the payment request could not be completed. In some implementations, the error message could include an indication of the problem (e.g., destination is not a member of a supported RTP network 100, the supernetwork has insufficient funds at the destination, etc.). Once the error message is sent, the process can end.

Figure 6:
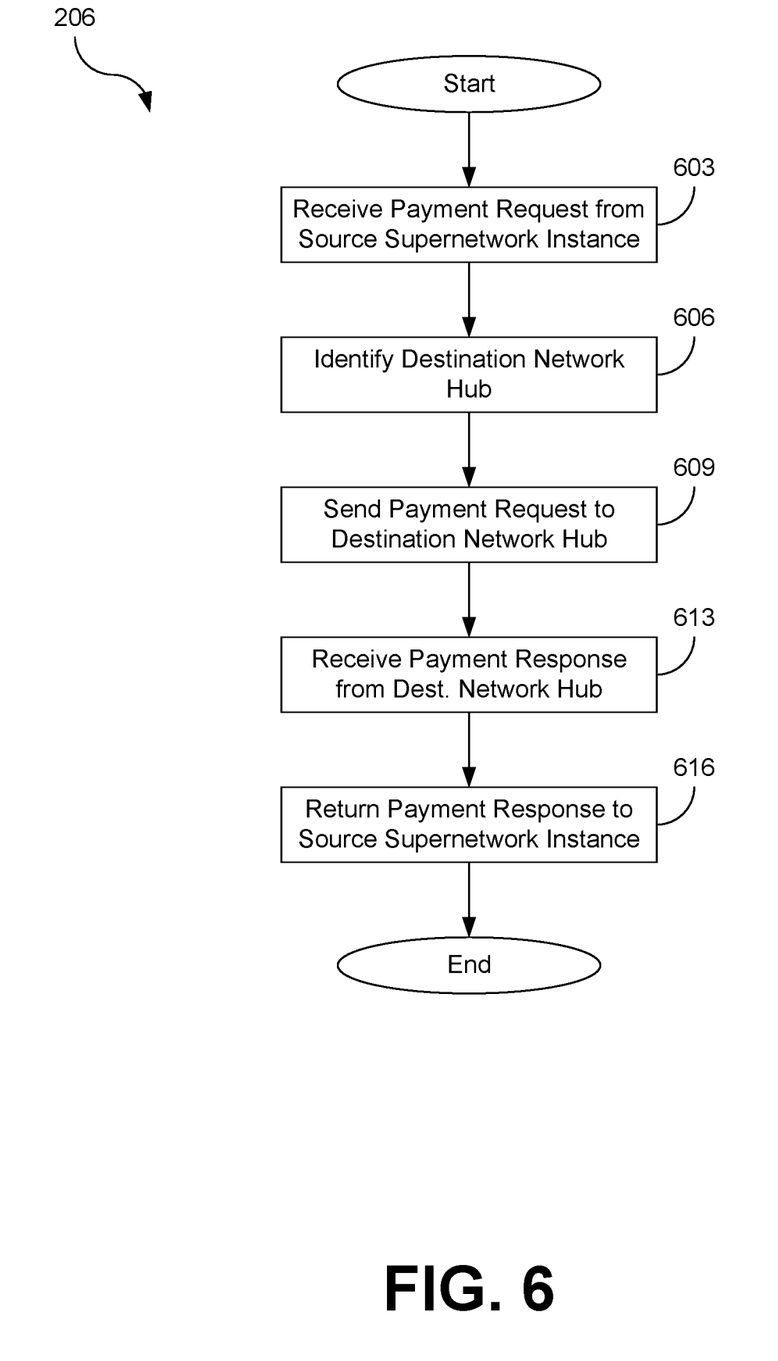
FIG. 6 is a flowchart illustrating one example of functionality implemented as portions of an application executed in a computing environment in the super network of FIG. 2 according to various embodiments of the present disclosure.

Referring next to FIG. 6, shown is a flowchart that provides one example of the operation of a portion of the global transaction router 206. The flowchart of FIG. 6 provides merely an example of the many different types of functional arrangements that can be employed to implement the operation of the depicted portion of the global transaction router 206. As an alternative, the flowchart of FIG. 6 can be viewed as depicting an example of elements of a method implemented within the supernetwork 200.

Beginning with block 603, the global transaction router 206 (e.g., global transaction router 206b) of a second supernetwork instance (e.g., supernetwork instance 203b) can receive a payment request from a first global transaction router 206 (e.g., global transaction router 206a) hosted or executed by a first supernetwork instance (e.g., supernetwork instance 203a). The payment request could be received as a result of the first global transaction router 206 determining that the second global transaction router 206 has a connection to the network hub 106 of the recipient of the payment. An example of this process has been previously discussed and illustrated by FIG. 5.

Then, at block 606, the global transaction router 206 identify the destination network hub 106. For example, the global transaction router 206 could analyze the payment request to determine the participant identifier 116 of the recipient. The global transaction router 206 could then query the participant status cache to search for a participant record 216 with a matching participant identifier 116. The global transaction router 206 could then retrieve the network identifier 109 from the participant record 216. The global transaction router 206 could then query the RTP registration data in participant cache registry 211 to determine that the destination network hub 106 is connected to the global transaction router 206. However, in some instances, the global transaction router 206 could cache a list of network hubs 106 that it is connected to, in which case the global transaction router 206 could query its cache instead of the participant cache registry 211.

Next, at block 609, the global transaction router 206 could then forward or otherwise send the payment request received at block 603 to the network hub 106 identified at block 606.

Moving on to block 613, the global transaction router 206 can receive a payment response from the destination network hub 106 that the payment request was forwarded to at block 609. The payment response, as previously discussed, could be a payment acceptance, a payment rejection, or other payment status message.

Subsequently, at block 616, the global transaction router 206 can return the payment response received at block 613 to the source supernetwork instance 203 from which the payment request was received at block 603. For example, the global transaction router 206 could search the participant status cache 209 to identify a participant record 216 with a matching participant identifier 116 specifying the source of the payment and, therefore, the destination for the payment response. The global transaction router 206 could obtain the network identifier 109 from the identified participant record 216. This could be skipped, however, in those instances where the payment response included the network identifier 109 identifying the destination of the payment response. The global transaction router 206 could then search the RTP registration data 217 in the participant registry 211 to identify the supernetwork instance 203 that is associated with the network identifier 109, and forward the payment response to the identified supernetwork instance 203. The process can subsequently end.

Figure 7:
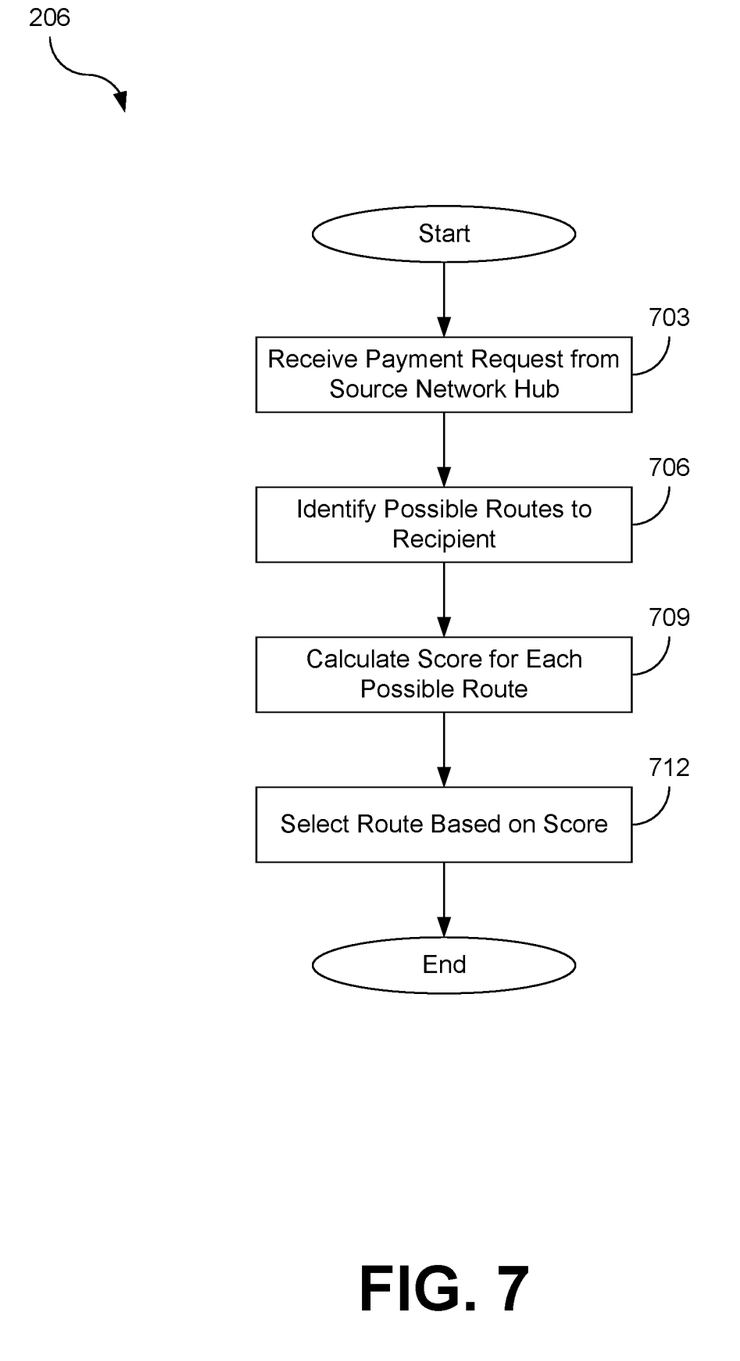
FIG. 7 is a flowchart illustrating one example of functionality implemented as portions of an application executed in a computing environment in the super network of FIG. 2 according to various embodiments of the present disclosure.

Referring next to FIG. 7, shown is a flowchart that provides one example of the operation of a portion of the global transaction router 206. The flowchart of FIG. 7 provides merely an example of the many different types of functional arrangements that can be employed to implement the operation of the depicted portion of the global transaction router 206. As an alternative, the flowchart of FIG. 7 can be viewed as depicting an example of elements of a method implemented within the supernetwork 200.

At block 703, the global transaction router 206 can receive a payment request from a source network hub 106. For example, the payment request could have been received as part of the process performed by the source network hub 106 at block 323. The payment request can include information such as the network identifier 109 and participant identifier 116 of the participant making the payment, the participant identifier 116 of the recipient, the network identifier 109 of the participant (if known), the amount of the payment, and potentially other information depending on the particular implementation of the present disclosure.

At block 706, the global transaction router 206 can identify one or more possible routes to the recipient for the payment request. The global transaction router 206 can identify possible routes by, for example, determining whether a participant record 216 exists that matches a participant identifier 116 for the recipient by querying a participant status cache 209. The global transaction router 206 can retrieve a plurality of network identifiers 109 from the participant record 216. Each of the plurality of network identifiers 109 can identify a different network hub 106 that can route the payment request to the recipient. Likewise, each of the network identifiers 109 can represent a different route to the recipient for the payment request. If any of the plurality of network identifiers 109 does not match a network hub 106 connected to a supernetwork instance 203 of the global transaction router 206, the global transaction router 206 can identify another supernetwork instance 203 to which that network hub 106 is connected based on the RTP registration data 217.

At block 709, the global transaction router 206 can calculate scores for the possible routes identified at block 706. The scores can be calculated based on weighed routing factors corresponding to each of the possible routes. The routing factors can be used to evaluate whether each possible route- and an RTP network 100 associated with each possible route—is consistent with routing preferences included with the payment request. To that end, each factor can be assigned a weight based on those routing preferences. The global transaction router 206 can retrieve information used to evaluate the routing factors from RTP registration data 217 for each RTP network 100 associated with a possible route. Examples of routing factors can include a speed of payments made using an RTP network 100, cost of the payment if made using the RTP network 100, reliability of the RTP network 100, timing options for the payment, whether any cutoff time or holiday will interfere with completion of the payment, whether the payment can be batched, the availability of sponsored offers for the payment, and potentially other routing factors.

At block 712, the global transaction router 206 can select a route based on the scores calculated at block 709. The global transaction router 206 can select a route receiving a highest score among the possible routes. The route receiving the highest score can be the route that most closely accords with the one or more routing preferences including with the payment request.

At block 715, the global transaction router 206 can send the payment request along the route selected at block 712. For example, the global transaction router 206 can send the payment request to a destination network hub 106 on the selected route if the destination network hub 106 is connected to a supernetwork instance 203 of the global transaction router 206. As another example, if the destination network hub 106 is not connected to the supernetwork instance 203 of the global transaction router 206, the global transaction router 206 can send the payment request to a destination supernetwork instance 203 that is connected to the destination network hub 106. The destination supernetwork instance 203 can be identified using the RTP registration data 217 in the participant registry 211. The process could then proceed to completion.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
    a computing device comprising a processor and a memory; and
    a global transaction router configured to route payment requests between network hubs and hosted by a first supernetwork instance, the global transaction router comprising machine-readable instructions stored in the memory that, when executed by the processor, cause the computing device to at least:
receive a payment request from a source network hub connected to a first participant system within a first payment network and connected to the first supernetwork instance;
identify a plurality of routes from the global transaction router to a plurality of respective destination network hubs;
calculate a score for individual routes of the plurality of routes, the score being based at least in part on a plurality of routing factors;
select one of the plurality of routes based at least in part on the score; and
cause the payment request to be provided to a destination network hub using the one of the plurality of routes, the destination network hub being connected to a second participant system within a second payment network.

2. The system of claim 1, wherein the payment request further comprises an identifier for a recipient institution, and the plurality of respective destination network hubs are associated with the recipient institution.

3. The system of claim 1, wherein the payment request comprises a plurality of routing preferences, and the global transaction router further causes the computing device to at least assign a weight to individual factors of the plurality of routing factors based at least in part on the plurality of routing preferences.

4. The system of claim 1, wherein the plurality of routing factors comprise a reliability of the payment, a timing of the payment, a cutoff time for the payment, or an option to batch the payment with a plurality of other payments.

5. The system of claim 1, wherein the global transaction router is a first global transaction router, and causing the computing device to cause the payment request to be provided to the destination network hub further causes the computing device to at least send the payment request to a second global transaction router hosted by a second supernetwork instance connected to the destination network hub.

6. The system of claim 1, wherein the global transaction router causing the computing device to cause the payment request to be provided to the destination network hub further causes the computing device to at least send the payment request to the destination network hub.

7. The system of claim 1, wherein the global transaction router causing the computing device to cause the payment request to be provided to the destination network hub further causes the computing device to at least:
combine the payment request with a plurality of other payment requests to generate a batch of payment requests; and
send the batch of payment requests to the destination network hub.

8. A method, comprising:
receiving, by a computing device, a payment request from a source network hub connected at least one participant system within a payment network and connected to a first supernetwork instance;
identifying, by the computing device, a plurality of routes from a global transaction router to a plurality of respective destination network hubs;
calculating, by the computing device, a score for individual routes of the plurality of routes, the score being based at least in part on a plurality of routing factors;
selecting, by the computing device, one of the plurality of routes based at least in part on the score; and
causing, by the computing device, the payment request to be provided to a destination network hub using the one of the plurality of routes, the destination network hub being connected to a second participant system within a second payment network.

9. The method of claim 8, wherein the payment request further comprises an identifier for a recipient institution, and the plurality of respective destination network hubs are associated with the recipient institution.

10. The method of claim 8, wherein the payment request comprises a plurality of routing preferences, the method further comprising assigning weight to individual factors of the plurality of routing factors based at least in part on the plurality of routing preferences.

11. The method of claim 8, wherein the plurality of routing factors comprise a reliability of the payment, a timing of the payment, a cutoff time for the payment, or an option to batch the payment with a plurality of other payments.

12. The method of claim 8, wherein the global transaction router is a first global transaction router, and causing the payment request to be provided to the destination network hub further comprises sending, by the computing device, the payment request to a second global transaction router hosted by a second supernetwork instance connected to the destination network hub.

13. The method of claim 8, wherein causing the payment request to be provided to the destination network hub further comprises sending, by the computing device, the payment request to the destination network hub.

14. The method of claim 8, wherein causing the payment request to be provided to the destination network hub further comprises:
combining the payment request with a plurality of other payment requests to generate a batch of payment requests; and
sending the batch of payment requests to the destination network hub.

15. A non-transitory, computer-readable medium, comprising a global transaction router configured to route payment requests between network hubs and hosted by a first supernetwork instance, the global transaction router comprising machine-readable instructions, when executed by a processor of a computing device, cause the computing device to at least:
receive a payment request from a source network hub connected to a first participant system within a first payment network and connected to the first supernetwork instance;
identify a plurality of routes from the global transaction router to a plurality of respective destination network hubs;
calculate a score for individual routes of the plurality of routes, the score being based at least in part on a plurality of routing factors;
select one of the plurality of routes based at least in part on the score; and
cause the payment request to be provided to a destination network hub using the one of the plurality of routes, the destination network hub being connected to a second participant system within a second payment network.

16. The non-transitory, computer-readable medium of claim 15, wherein the payment request further comprises an identifier for a recipient institution, and the plurality of respective destination network hubs are associated with the recipient institution.

17. The non-transitory, computer-readable medium of claim 15, wherein the payment request comprises a plurality of routing preferences, and the global transaction router further causes the computing device to at least assign a weight to individual factors of the plurality of routing factors based at least in part on the plurality of routing preferences.

18. The non-transitory, computer-readable medium of claim 15, wherein the plurality of routing factors comprise a reliability of the payment, a timing of the payment, a cutoff time for the payment, or an option to batch the payment with a plurality of other payments.

19. The non-transitory, computer-readable medium of claim 15, wherein the global transaction router is a first global transaction router, and causing the computing device to cause the payment request to be provided to the destination network hub further causes the computing device to at least send the payment request to a second global transaction router hosted by a second supernetwork instance connected to the destination network hub.

20. The non-transitory, computer-readable medium of claim 15, wherein the global transaction router causing the computing device to cause the payment request to be provided to the destination network hub further causes the computing device to at least:
 combine the payment request with a plurality of other payment requests to generate a batch of payment requests; and
 send the batch of payment requests to the destination network hub.

* * * * *